April 30, 1940.　　　E. G. MUELLER　　　2,199,111
BRAKE RIGGING
Filed March 18, 1939　　　2 Sheets-Sheet 1

INVENTOR
Emil G. Mueller.
BY
HIS ATTORNEY

April 30, 1940. E. G. MUELLER 2,199,111
BRAKE RIGGING
Filed March 18, 1939 2 Sheets-Sheet 2

INVENTOR
Emil G. Mueller
BY
HIS ATTORNEY

Patented Apr. 30, 1940

2,199,111

UNITED STATES PATENT OFFICE 2,199,111

BRAKE RIGGING

Emil G. Mueller, Swissvale, Pa., assignor to The American Brake Company, Swissvale, Pa., a corporation of Missouri Application March 18, 1939, Serial No. 262,738

13 Claims. (Cl. 188—56)

My invention relates to brake rigging for railway rolling stock, and particularly to brake rigging for use on the trucks of modern high speed locomotives.

In the design of modern high speed locomotives, every effort is being made to lower the center of gravity of the locomotives to facilitate their ability to negotiate curves at high speeds. When the center of gravity is lowered, the space available on the locomotive trucks for the brake rigging is lessened, and this fact coupled with the necessity for more powerful brake rigging to provide sufficient retarding force at the high speeds, has made the problem of providing a satisfactory brake rigging for the locomotive trucks an extremely difficult one.

One object of my present invention is to provide for the trucks of locomotives a simple, strong and efficient brake rigging which is designed particularly with a view to overcome clearance problems and to provide the required braking effort, and which at the same time can be manufactured at a reasonable cost.

Other objects and characteristic features of my invention will appear as the description proceeds.

I shall describe one form of brake rigging embodying my invention, and shall then point out the novel features thereof in claims.

Figure 1:
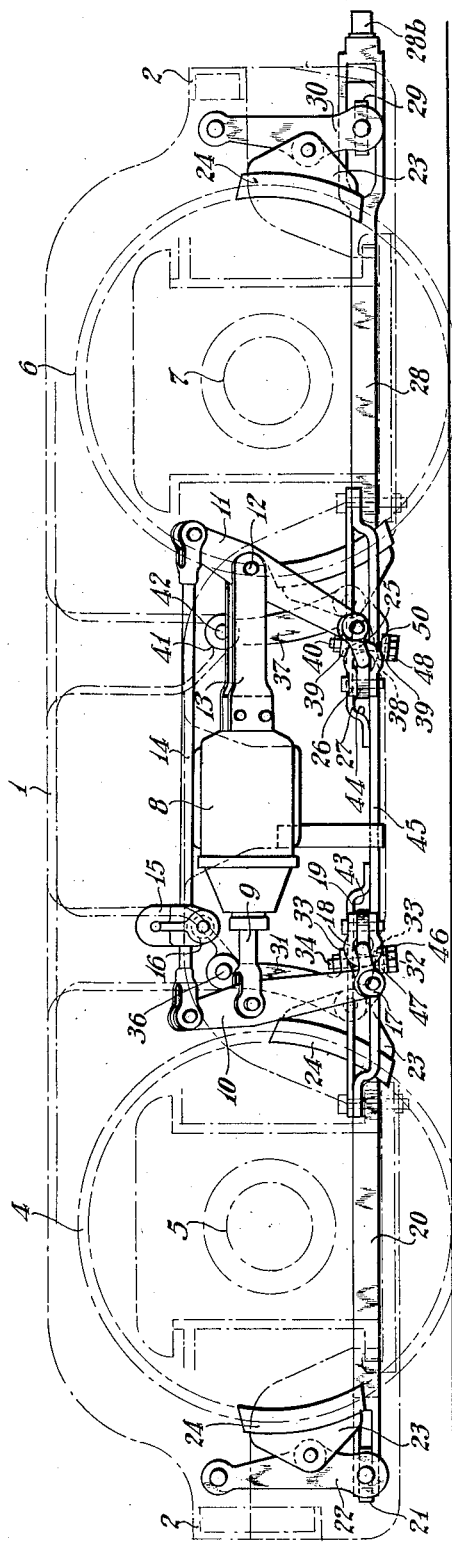
Figure 2:
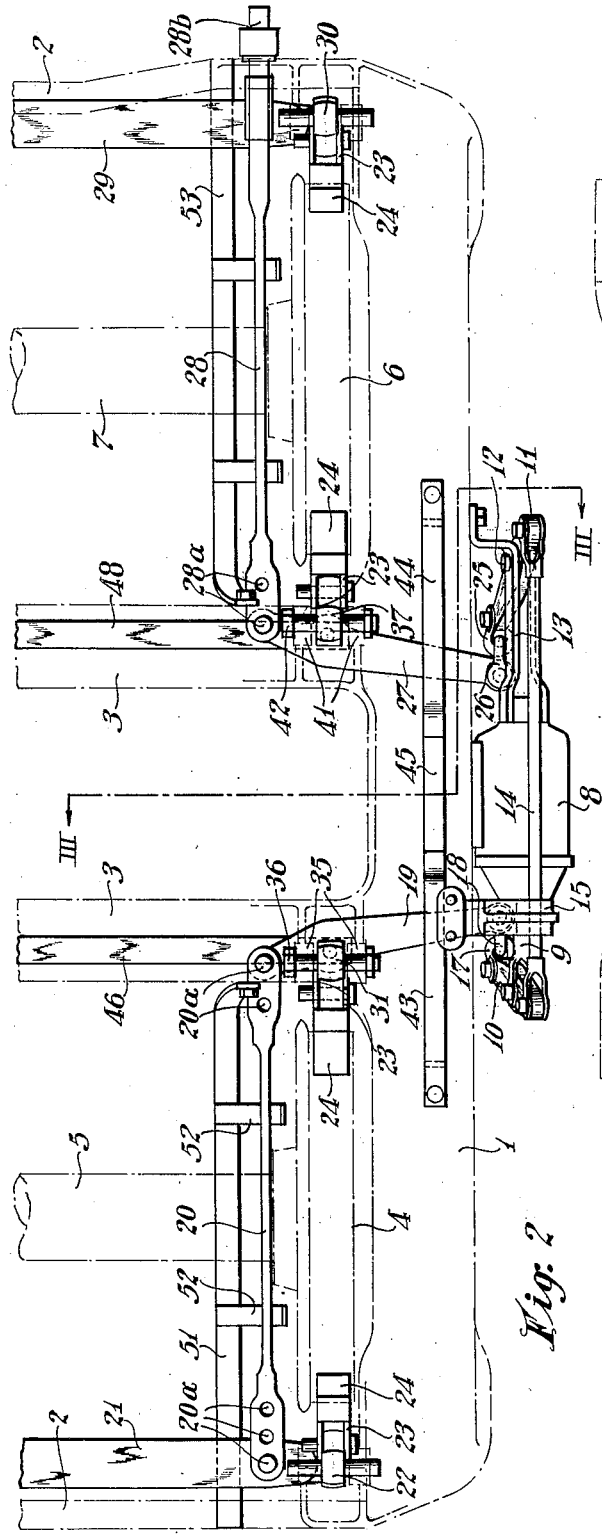
Figure 3:
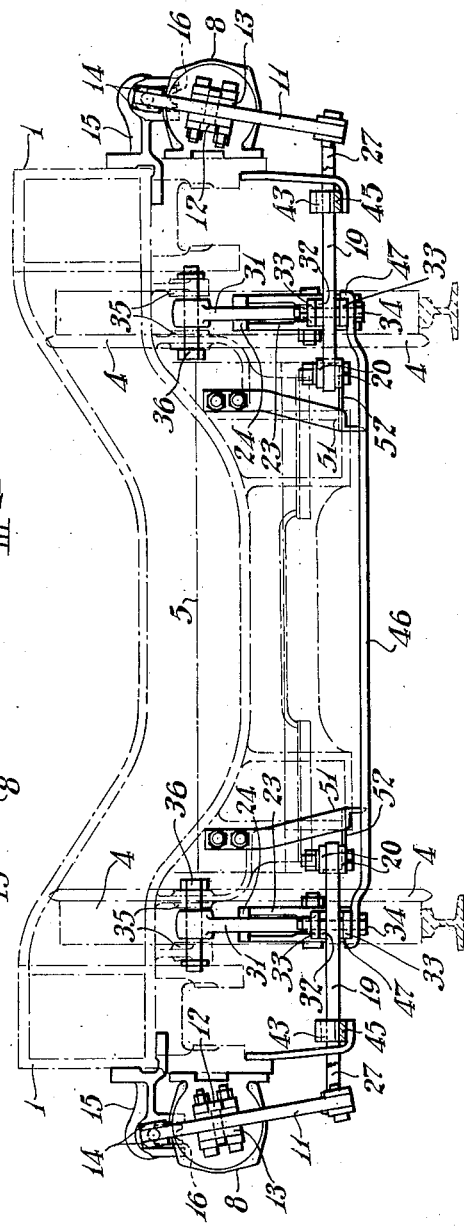

In the accompanying drawings, Fig. 1 is a side elevational view of a locomotive truck provided with brake rigging embodying my invention, the truck frame being shown in dot and dash lines to more clearly illustrate the showing of the brake rigging. Fig. 2 is a top plan view of that portion of the truck frame and brake rigging shown in Fig. 1 which is located on one side of the longitudinal center line of the truck. Fig. 3 is a fragmentary cross sectional view of the truck and brake rigging taken substantially on the line III—III of Fig. 2 and showing the transversely extending connecting rod which connects the two hanger levers associated with the wheels 4 together.

Similar reference characters refer to similar parts in each of the several views.

Referring first to Fig. 1, the truck to which I have here shown my invention applied is a four-wheel locomotive truck, and comprises a cast metal frame having spaced side members 1 integrally connected together by end members 2 and spaced transoms 3, only one of the side members 2 being shown. The truck frame is supported at one end by a wheel and axle assembly comprising a pair of wheels 4 mounted on an axle 5, and at the other end by a wheel and axle assembly comprising a pair of wheels 6 mounted on an axle 7. The means for supporting the truck frame by the wheel and axle assemblies is not shown because these means are well known and form no part of my present invention.

The brake rigging comprises two sets of interconnected rods and levers, one set of which is arranged at each side of the truck, and inasmuch as the two sets are similar it is believed that a description of one will suffice for both.

Referring to the set shown in the drawings, this set is actuated by a brake cylinder 8 which, in order to provide the desired clearance between the brake rigging and the various engine parts, is preferably secured to the side member 1 outboard of the wheels approximately midway between the two wheel and axle assemblies with its axis disposed a little above the plane of the wheel axes. The brake cylinder 8 is of the usual and well-known construction, and includes the usual cylinder body, reciprocable piston (not shown) biased to the inner end of its stroke by the usual release spring (not shown), and a push rod 9 which is operatively connected with the piston.

Located at the opposite ends of the brake cylinder 8 are two brake cylinder levers 10 and 11. The brake cylinder lever 11 is pivotally supported intermediate its ends on a pin 12 mounted in a cylinder lever bracket 13, while the lever 10 is pivotally connected intermediate its ends with the push rod 9. The cylinder lever bracket 13 is secured at one end to the brake cylinder 8 and is bolted at its other end to the side member 1. Both brake cylinder levers are inclined to the vertical with their lower ends closer to the truck frame than their upper ends to provide clearance for wayside objects such as loading platforms and the like, and the two levers are connected together at their upper ends by a pull rod 14. The pull rod 14 is supported at the end adjacent to the lever 10 by means of a bracket 15 secured to the side member 1 and having a roller 16 upon which the pull rod is movable, and it will be seen, therefore, that the pull rod 14 assists in supporting the brake cylinder lever 10.

At its lower end the brake cylinder lever 10 is connected by means of clevises 17 and 18 with the outer end of a horizontally disposed transversely extending live lever 19, the inner end of which is connected by means of a pull rod 20 with one end of a brake beam 21. The brake beam 21 extends transversely of the wheels 4 at their outer or rear sides, and is movably supported at each end from the truck frame by means of hanger levers 22 carrying brake heads 23 provided with brake shoes 24 for engagement with the wheels, only one hanger lever 22 being shown in the drawings. The pull rod 20 is provided at each end with a series of holes 20a to provide the necessary adjustment to take up slack in the brake rigging caused by wear.

The brake cylinder lever 11 is similarly connected at its lower ends by means of clevises 25 and 26 with the outer end of a horizontally disposed transversely extending live lever 27, the inner end of which is connected by means of a pull rod 28 with one end of a brake beam 29. The brake beam 29 extends transversely of the wheels 6 at their outer or forward sides, and is movably supported at each end from the truck frame by means of hanger levers 30 carrying brake heads 23 provided with brake shoes 24 for engagement with the wheels 6, only one hanger lever 30 being shown in the drawings. The pull rod 28 is provided at the end which is connected to the live lever 27 with a series of holes 28a and at the end which is connected with the brake beam 29 with a slack adjuster 28b of well-known construction, to facilitate taking up the slack which may develop in the brake rigging due to wear.

Intermediate its ends the live lever 19 engages the lower end portion of a vertically disposed hanger lever 31 within a recess 32 formed by spaced jaws 33 of the lever. This portion of the lever 19 is secured against accidental separation from the hanger lever by means of a bolt 34 which extends through registering openings in the jaws 33 and lever 19. The hanger lever 31 is located in the plane of the wheels 4 and 6 adjacent to the wheel 4, and is pivotally connected at its upper end to spaced lugs 35 on the side member 1 by means of a pin 36. The hanger lever intermediate its ends has secured thereto a brake head 23 provided with a brake shoe 24 for cooperation with the tread of the wheel 4.

In a similar manner, the live lever 27, intermediate its ends, engages the lower end portion of a vertically disposed hanger lever 37 within a recess 38 formed by spaced jaws 39 of the lever. The lever 27 is secured to the hanger lever 37 by means of a bolt 40 which extends through registering openings in the jaw 39 and in the lever 27. The hanger lever 37 is located in the plane of the wheels 4 and 6 adjacent to the rear side of the wheel 6, and is pivotally attached at its upper end to spaced lugs 41 on the side member 1 by means of a pin 42. A brake head 23 provided with a brake shoe 24 for cooperation with the wheel 6 is secured to the hanger lever 37 intermediate its ends.

Adjacent their outer ends the two live levers 19 and 27 are slidably supported within guideways 43 and 44 formed in a lever support 45 which is bolted at its ends to the side member 1 adjacent pedestal jaws formed in the side frame, whereby the live levers are maintained in their horizontal positions without strain on the associated hanger levers and pull rods.

Extending laterally of the truck is a connecting bar 46 which has each of its end portions secured to the lower jaw 33 of a different one of the hanger levers 31 by the associated bolt 34. Each end of the connecting bar is provided with an upstanding flange 47 which engages the outer side edge of the jaw 33 of the adjacent hanger lever 31. These flanges due to their engagement with the hanger levers relieve the bolts 34 of transverse shearing stresses to which the bolts are liable to be subjected.

A connecting bar 48 which also extends laterally of the truck is likewise secured at each end to the lower jaw 39 of a different one of the hanger levers 37 by the associated bolt 40. The bar 48 is provided at each end with an upstanding flange 50 which engages the outer side edge of the jaw 39 of the adjacent hanger lever 37 and which relieves the bolts 40 of transverse shearing stresses to which these bolts are liable to be subjected.

An auxiliary rod and beam support 51 is secured at one end to the end member 2 of the frame and at the other end to one of the transoms 3, and extends underneath the brake beam 21 to prevent it from dropping in the event the hanger levers 22 should become broken or the brake beam should become disconnected from these hanger levers for any reason. This support is also provided with arms 52 which extend underneath the pull rod 20 to prevent it from dropping in the event it becomes disconnected from the brake beam 21 or the live lever 19.

A similar auxiliary rod and beam support 53 is provided to prevent the beam 29 and the pull rod 28 from dropping in the event that these parts become disconnected for any reason.

When it is desired to effect an application of the brakes, fluid under pressure is supplied to the brake cylinder 8 in the usual manner, thereby causing the push rod 9 to move outwardly in the cylinder. The outward movement of the push rod 9 moves the brake cylinder lever 10 toward the left, and this movement, in turn, acts through the pull rod 14 to rotate the brake cylinder lever 11 in a counterclockwise direction, and through the clevices 17 and 18 to move the outer end of the live lever 19 toward the left. The movement of the live lever 19, in turn, first acts through the hanger lever 31 to move the brake shoe 24 secured to this hanger lever into engagement with the wheel 4, and then causes the live lever 19 to rotate about the bolt 34, thereby causing the pull rod 20 to move toward the right and hence causing the brake beam 21 to move toward the wheel 4 and move the hanger lever 22 to the position in which the brake shoe 24 secured to this hanger lever engages the wheel 4. The counterclockwise rotation of the brake cylinder lever 11 acts through the clevices 25 and 26 to move the outer end of the live lever 27 toward the right, and as the outer end of this lever moves toward the right, it first causes the hanger lever 37 to swing toward the wheel 6 to the position in which the brake shoe 24 secured thereto engages the wheel, and then causes the lever 27 to rotate in a counterclockwise direction about the bolt 40. The counterclockwise rotation of the live lever 27, in turn, acts through the pull rod 28 and brake beam 29 to move the hanger lever 30 toward the wheel 6 to the position in which the brake shoe 24 secured to this hanger lever engages the wheel 6. It will be seen, therefore, that the brake rigging applies clasp brakes to both wheels 4 and 6.

When it is desired to release the brakes, the fluid pressure which was previously supplied to the brake cylinder 8 is vented to atmosphere, whereupon the release springs in the brake cylinder act to return the push rod 9 to its retracted position, and thereby move the brake shoes out of engagement with the wheels.

It should be noted that with the brake rigging constructed in this manner a large part of the brake rigging is disposed outboard of the wheels, and that that portion which of necessity must be disposed inboard of the wheels is below the wheel axles, where it will not interfere with any of the locomotive parts. It should further be noted that adequate clearance is provided for all parts to avoid interference with adjacent parts of the truck, and also to avoid damage due to trackway structures.

Although I have herein shown and described only one form of brake rigging embodying my invention, it is understood that various changes and modifications may be made therein within the scope of the appended claims without departing from the spirit and scope of my invention.

Having thus described my invention, what I claim is:

1. In a brake rigging for a railway vehicle truck comprising a truck frame supported by wheel and axle assemblies and provided with a side member, the combination of a brake cylinder secured to said side member outboard of the wheels, and two brake levers disposed at opposite ends of said cylinder and connected together at their upper ends, the one lever being operatively connected intermediate its ends with the piston of the brake cylinder, and the other lever being pivotally supported intermediate its ends in a cylinder lever bracket secured to the brake cylinder.

2. In a brake rigging for a railway vehicle truck comprising a truck frame supported by wheel and axle assemblies and provided with a side member, the combination of a brake cylinder secured to said side member outboard of the wheels, a first brake cylinder lever pivotally connected intermediate its ends with a push rod operated by said brake cylinder, a second brake cylinder lever pivotally supported intermediate its ends in a bracket secured to said brake cylinder, both said brake cylinder levers being inclined from the vertical with their lower ends closer to the truck frame than their upper ends to provide clearance for trackway objects, and means operatively connecting the upper ends of said levers.

3. In a brake rigging for a railway vehicle truck comprising a truck frame supported by wheel and axle assemblies and provided with a side member, the combination of a brake cylinder secured to said side member outboard of the wheels, a first brake cylinder lever pivotally connected intermediate its ends with a push rod operated by said brake cylinder, a second brake cylinder lever pivotally supported intermediate its ends in a bracket secured to said brake cylinder, both said brake cylinder levers being inclined from the vertical with their lower ends closer to the truck frame than their upper ends to provide clearance for trackway objects, a pull rod operatively connecting said levers, and a bracket secured to said side frame and provided with a roller which supports said pull rod at the end adjacent said first brake cylinder lever.

4. In a brake rigging for a railway vehicle truck the combination with a truck frame supported by spaced wheel and axle assemblies, of a brake beam supported at the outer side of each wheel and axle assembly by hanger levers carrying brake shoes for cooperation with the adjacent wheels, a horizontally disposed transversely extending live lever disposed adjacent the inner side of each wheel at one side of the truck and connected intermediate its ends with a hanger lever carrying a brake shoe for cooperation with the adjacent wheel, each said live lever being connected at its inner end with one end of the brake beam at the opposite side of the adjacent wheel, and means connected with said live levers at their outer ends for actuating them.

5. In a brake rigging for a railway vehicle truck the combination with a truck frame supported by spaced wheel and axle assemblies, of a brake beam supported at the outer side of each wheel and axle assembly by hanger levers carrying brake shoes for cooperation with the adjacent wheels, a horizontally disposed transversely extending live lever disposed adjacent the inner side of each wheel at one side of the truck and connected intermediate its ends with a hanger lever carrying a brake shoe for cooperation with the adjacent wheel, each said live lever being connected at its inner end with one end of the brake beam at the opposite side of the adjacent wheel, and means for actuating said live levers including a brake cylinder secured to the truck frame outboard of the wheels.

6. In a brake rigging for a railway vehicle truck the combination with a truck frame supported by spaced wheel and axle assemblies, a brake beam extending transversely of the one wheel and axle assembly at one side of the wheel and supported at its ends from the truck frame by means of hanger levers carrying brake shoes for cooperation with the wheels, a horizontally disposed transversely extending live lever disposed at the side of each wheel of said one wheel and axle assembly opposite to said brake beam and connected intermediate its ends with a hanger lever carrying a brake shoe for cooperation with the associated wheel and at its inner end with one end of said brake beam, and means connected with the outer ends of said live levers for actuating them.

7. In a brake rigging for a railway vehicle truck the combination with a truck frame supported by spaced wheel and axle assemblies, a brake beam extending transversely of the one wheel and axle assembly at the outer side of the wheel and supported at its ends from the truck frame by means of hanger levers carrying brake shoes for cooperation with the wheels, a horizontally disposed transversely extending live lever disposed at the inner side of each wheel of said one wheel and axle assembly and connected intermediate its ends with a hanger lever carrying a brake shoe for cooperation with the associated wheel and at its inner end with one end of said brake beam, and means connected with the outer ends of said live levers for actuating them.

8. In a brake rigging for a railway vehicle truck comprising a truck frame supported by two wheel and axle assemblies and including a side member, the combination of a brake cylinder secured to said side member outboard of the wheels, two brake cylinder levers located at opposite ends of said brake cylinder, the one said brake cylinder lever being operatively connected intermediate its ends with a push rod operated by said brake cylinder and the other said brake cylinder lever being pivotally mounted intermediate its ends in a bracket secured to the brake cylinder, both said brake cylinder levers being inclined from the vertical with their lower ends closer to the truck frame than their upper ends, a pull rod connecting the upper ends of said brake cylinder levers, and means connected with the lower ends of said brake cylinder levers for applying clasp brakes to the wheels on the same side of the truck as said brake cylinder.

9. In a brake rigging for a railway vehicle truck comprising a truck frame supported by two wheel and axle assemblies and including a side member, the combination of a brake cylinder secured to said side member outboard of the wheels, two brake cylinder levers located at opposite ends of said brake cylinder, the one said brake cylinder lever being operatively connected intermediate its ends with a push rod operated by said brake cylinder and the other said brake cylinder lever being pivotally mounted intermediate its ends in a bracket secured to the brake cylinder, both said brake cylinder levers being inclined from the vertical with their lower ends closer to the truck frame than their upper ends, a pull rod connecting the upper ends of said brake cylinder levers, and means including a pair of laterally extending horizontal live levers disposed between the wheels adjacent said brake cylinder and connected at their outer ends with the lower ends of said brake cylinder levers for applying clasp brakes to the contiguous wheels.

10. In a brake rigging for a railway vehicle truck comprising a truck frame supported by two wheel and axle assemblies and including a side member, the combination of a brake cylinder secured to said side member outboard of the wheels, two brake cylinder levers located at opposite ends of said brake cylinder, the one said brake cylinder lever being operatively connected intermediate its ends with a push rod operated by said brake cylinder and the other said brake cylinder lever being pivotally mounted intermediate its ends in a bracket secured to the brake cylinder, both said brake cylinder levers being inclined from the vertical with their lower ends closer to the truck frame than their upper ends a pull rod connecting the upper ends of said brake cylinder levers, two laterally extending horizontal live levers connected at their outer ends with the lower ends of said two brake cylinder levers respectively, and means actuated by said live levers for applying clasp brakes to the wheels.

11. In a brake rigging for a railway vehicle truck comprising a truck frame supported by two wheel and axle assemblies and including a side member, the combination of a brake cylinder secured to said side member outboard of the wheels, two brake cylinder levers located at opposite ends of said brake cylinder, the one said brake cylinder lever being operatively connected intermediate its ends with a push rod operated by said brake cylinder and the other said brake cylinder lever being pivotally mounted intermediate its ends in a bracket secured to the brake cylinder, both said brake cylinder levers being inclined from the vertical with their lower ends closer to the truck frame than their upper ends, a pull rod connecting the upper ends of said brake cylinder levers, two laterally extending horizontal live levers connected at their outer ends with the lower ends of said two brake cylinder levers respectively and connected intermediate their ends with hanger levers carrying brake shoes for cooperation with the adjacent wheels, and brake beams extending transversely of the wheels at their outer sides and supported at their ends by hanger levers carrying brake shoes for cooperation with the adjacent wheels and each connected adjacent one end with the inner end of one of said live levers.

12. In a brake rigging for a railway vehicle truck comprising a truck frame supported by spaced wheel and axle assemblies, a pair of horizontally extending live levers disposed between the wheels at each side of the truck and connected intermediate their ends with hanger levers carrying brake shoes for cooperation with the adjacent wheels, tie rods connecting the hanger levers associated with the two wheels on the same wheel and axle assembly, means connected with the inner end of each live lever for applying a brake shoe to the side of the associated wheel opposite to the live lever, and means connected with the outer ends of the live levers for actuating them.

13. In a brake rigging for a railway vehicle truck comprising a truck frame supported by spaced wheel and axle assemblies, a pair of horizontally extending live levers disposed between the wheels at each side of the truck and connected intermediate their ends with hanger levers carrying brake shoes for cooperation with the adjacent wheels, tie rods connecting the hanger levers associated with the two wheels on the same wheel and axle assembly, means connected with the inner end of each live lever for applying a brake shoe to the side of the associated wheel opposite to the live lever, and a brake cylinder secured to the truck frame at each side of the truck outboard of the wheels operatively connected with the outer ends of the adjacent live levers for actuating them.

EMIL G. MUELLER.